United States Patent Office 3,295,038
Patented Dec. 27, 1966

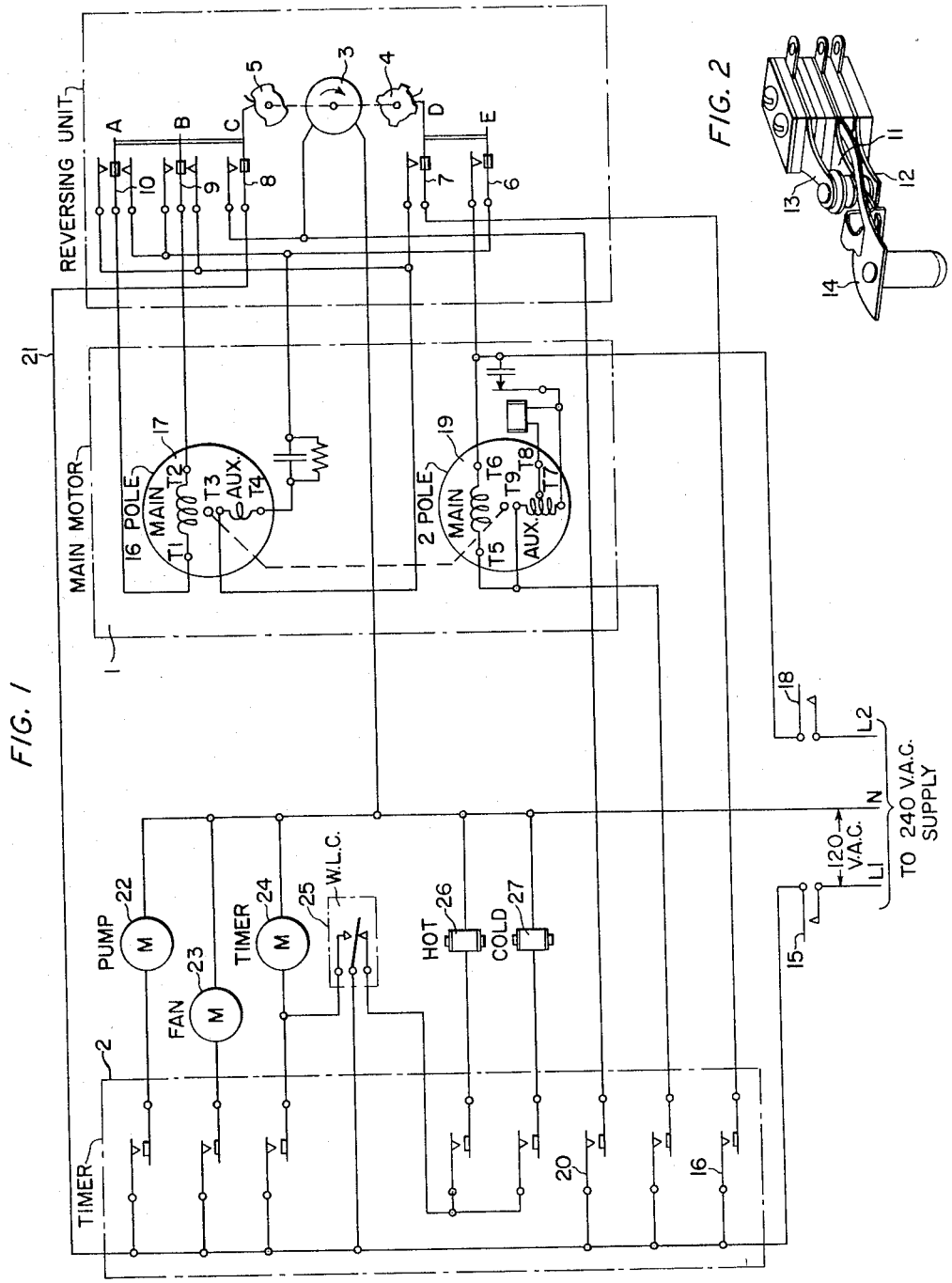

3,295,038
REVERSING MECHANISM AND CIRCUIT FOR REVERSING AN ELECTRIC MOTOR AND CONTROLLING ITS FUNCTIONS
Harold H. Trottman, Ashland, Ohio, assignor to Westinghouse Electric Corporation, Pittsburgh, Pa., a corporation of Pennsylvania
Filed Apr. 27, 1964, Ser. No. 362,732
2 Claims. (Cl. 318—282)

This invention relates to electric motors and control means therefor and particularly to circuit means for controlling the connections used for periodically reversing the direction of rotation of a motor.

An object of the invention is to provide means for periodically reversing the direction of rotation of a motor, the said means being embodied in a small and simple unit operated by a means known as a clock motor.

In accordance with this invention the motor reversing control unit is small, compact, simple and can be mounted any place in the product. Basically it consists of but four elements, a motor, a frame, a cam driven by the motor and a switch assembly driven by the cam. The motor is an ubiquitous alternating current clock motor which responds to a simple on and off switching operation carried out by the conventional escapement timer of the product.

Conventionally, in a washing machine, there are two periods provided by such timer when the tub must be alternately run clockwise and counterclockwise, and conventionally this is controlled by some mechanical gearing. However, by the use of a reversible motor, the machine may be operated in clockwise and counterclockwise directions in, let us say, twenty second periods during the times set out by the timer for washing and for rinsing and operated, let us, in a clockwise direction at all other times.

The load on the reversing control motor is light as the switching means consist of conventional snap grasshopper spring type switching devices whose biasing springs are moved by a cam rotated by the clock motor. These conventional spring switches are made up each of a movable contact which will snap into engagement with a "front" contact or with a "back" contact and will hold in either of said positions until the bias spring is moved to the other position. In the present disclosure a double pole, double throw switch is constructed from a pair of these conventional spring switches for turning the power on and off and a triple pole double throw switch is constructed from three of these spring switch units for controlling the connections for causing the motor to run one way or the other and to insure that the motor will always run in a given direction when this reversing control unit is not in operation.

A feature of the invention resides in these double throw switches which are provided with front and back contacts, but no neutral positions. In accordance with this feature the double throw power control switch connects the power leads to the motor through its front contacts and severes such connections when snapped over to its back contacts. Firm connections from its swingers to its front contacts and its back contacts are made with pressure exerted by its swingers in either direction with no neutral position provided. The pressure is provided by the formation of the swingers which hold firmly in one position until an outside force, here provided by a cam, moves the end of the swinger beyond a neutral point whereupon the swinger snaps over into its alternate position. The contact pressure, therefore, does not depend on any outside force and the movement of the swingers in operating is rapid.

A feature of the invention is the use of one cam for biasing the double pole switch to stop and start the main motor and a second cam for biasing the triple pole switch to reverse the direction of its rotation, these two cams being driven by the same means but overlapping in their operations so that the reversing switch is operated after the main motor is turned off and is again turned on before this motor is again started. By this means arcing over of the contacts of the reversing switches is prevented.

Another feature of the invention is a means controlled by this reversing control unit to automatically come to a halt in a position where the main motor will run in a given direction. Where it is desired to operate the main motor in a clockwise direction during the pump and spin operations, that is during those operations where it operates in a single direction, then when the timer signals that a period where the motor is periodically reversed has terminated, if the reversing contacts happen to be in a position to cause the main motor to operate in a counterclockwise position, a bypass circuit independent of the circuitry of the timer will be maintained so that the reversing unit will be driven on until a position where the circuitry for clockwise operation of the main motor is reached.

Further, in accordance with this invention a reversible two-speed motor is employed. Here, by way of example, there is provided a two-pole main and auxiliary winding for high speed operation and a sixteen pole main and auxiliary winding for slow speed operation. The sixteen pole main winding alone is reversed to bring about the desired reversal of operation, the auxiliary winding serving for starting purposes in either direction.

The motor reversing control unit of the present invention is particularly well adapted for the control of motors having a plurality of control wires, such as the reversible motor of the present invention having a two-pole and a sixteen-pole winding and such as poly-phase motors. Here, any desired motor terminals may be switched as by the present three-pole double-throw snap grasshopper spring type device.

Another feature of this invention is the means for providing sufficient delay when the main motor is turned off to allow such motor and the tub to come to a stop before the motor starts in the opposite direction. The control of the main motor, as hereinbefore set forth, lies in the said reversing unit so that the interval provided by the cam which controls this switching operation may be set at any desired value. Thus the means for providing sufficient delay between the stopping and the restarting of the motor and the tub is used for the switching of the reversing connections; in other words, this interval is determined to provide time for a double purpose, the slowing down and stopping of the motor of the tub and the time for the said switching of the reversing connections.

Other features will appear hereinafter.

The drawings consist of a single sheet having two figures as follows:

FIG. 1 is a schematic circuit diagram showing the wiring used for interconnecting the appliance motor, the conventional timer and the motor reversing control unit, and FIG. 2 is a perspective view of a snap grasshopper spring switch.

The appliance operated by the two-speed reversible motor herein represented by the dot-and-dash oblong 1 is equipped with a conventional escapement timer likewise represented by the dot-and-dash oblong 2. A reversing control unit shown at the right of this figure comprises a small alternating current motor 3, two cams 4 and 5 driven by this motor and a double-pole switch having the swingers 6 and 7 driven by the cam 4 and a triple-pole switch having the swingers 8, 9 and 10 driven by the cam 5. Each of these swingers is a movable contact spring capable of establishing a contact to a "front" or a "back" contact. Such a device, as pictured in the perspective drawings, FIG. 2, establishes a firm contact between its swinger 11 and its lower contact 12 or its upper contact 13, always establishing one or the other of these contacts. The spring 14 is a biasing means which when lifted upwardly (as shown) will cause the swinger 11 to snap over to its other position and into contact with its upper contact 13. When at some later time the biasing spring is moved downwardly, the swinger 11 will be snapped to its lower position into contact with its lower contact 12. The swinger 11 is dished so that it will spring quickly from one position to another under the influence of the biasing spring 14. This device is conventional and is known as a snap grasshopper spring type switch. Each of the switches A, B, C, D and E are of this type and each has a front and back contact as well as a swinger, though in the diagram FIG. 1, some of these contacts where not actually used are not shown.

The double pole switch consisting of the units D and E and controlled by the cam 4 will operate to turn the power off and on. As shown, the power may be traced from L1 of the source of power, the door switch 15, the timer contact 16, closed when the motor running at low speed is to be periodically reversed, the swinger 7 and its back contact, the back contact of swinger 9 and the front contact of swinger 10, and as shown the swinger 9, the terminal T2 of the main winding of the low speed winding 17, the terminal T1 of this winding, the swinger 10, the back contact thereof, the swinger 6 and its back contact, the door switch 18 to the L2 terminal of the source of power. Thus when the cam 4 moves to lift the biasing springs of the double-pole switch made of units D and E, the power is off and when this cam moves to drop the swingers 6 and 7 the power is turned on. It may be noted that the switches A, B and C will operate to lift the swingers 8, 9 and 10 or to drop them during the interval when the swingers 6 and 7 are lifted whereby the contacts of the switch units 9 and 10 produce no arcing. It may also be noted that the length of time over which the switches D and E are operated is controlled by the length of the high portions of the cam 4 so that the main motor is given sufficient time to come to a full stop before the power is again applied to the main motor.

Regarding the main motor depicted in box 1, it may be noted that this consists of a low speed (sixteen-pole) winding 17 and a high speed (two-pole) winding, each having a main winding and an auxiliary winding. Such a device is conventional and need not be further described.

During such periods as the wash and the rinse periods of the appliance, a contact 20 of the timer connects the reversing unit motor 3 between the L1 terminal of the source of power and the N terminal thereof so that this motor 3 will operate. When the timer contact 20 opens, if the cam 5 has the switches A, B and C lifted for counter-clockwise operation, then a bypass circuit 21 to the L1 terminal of the source of power is connected through the swinger 8 to the motor 3 to hold this in operation until the switches A, B and C are dropped to the positions shown which corresponds to a clockwise operation position at low speed. This insures that the main motor will, at all times other than when it is to be periodically reversed, run in the same direction e.g. clockwise.

It is believed that other elements of the appliance shown here schematically, such as the pump 22, the fan 23, the timer motor 24, the water level control 25, the solenoid 26 for controlling the supply of hot water and the solenoid 27 for controlling the supply of cold water are sufficiently clear for an understanding of the present invention.

What is claimed is:
1. In a laundry appliance:
a two-speed reversible motor,
a first timer for controlling the order and the length of time intervals for a plurality of different appliance operations including periodic forward and reverse operations of said reversible motor at the lower of said two speeds,
a reversible motor reversing unit controlled by said first timer including a motorized second timer connected for energization through said first timer, and stop-start switch means controlled by said second timer for stopping and starting said reversible motor, and reversing switch means controlled by said second timer for switching connections to said reversible motor while said stop-start switch means is open to reverse the direction of operation of said reversible motor, and
a bypass circuit for energizing said second timer after its said energizing connection from said timer is opened and until said reversing switch means has established connections to drive said reversible motor in a predetermined direction,
said bypass circuit including said reversing switch means so that energization of said second timer through said bypass circuit is terminated when said reversing switch means is actuated to a position establishing said connections to drive said reversible motor in said predetermined direction.

2. In a laundry appliance:
a two-speed reversible motor having a low speed winding and a high speed winding,
first timer means for controlling the order and length of time intervals for a plurality of different appliance operation including periodic forward and reverse operations of said motor at the low speed,
first circuit means for controlling the energization of said low speed winding for certain of said operations, said circuit means including reversing switch means and start-stop switch means,
second timer means for controlling the operation of said reversing switch means and start-stop switch means in a sequence of stop, reverse, start, to prevent such arcing in said reversing switch means as would occur by repositioning said reversing switch means while said reversible motor is energized through said start-stop switch means,
second circuit means for energizing said second timer means through said first timer means, and
third circuit means bypassing said first timer for energizing said second timer means independently of said first timer, said third circuit means including switch means operable simultaneously with said reversing switch means so that said third circuit means maintains said second timer energized while said reversing switch means is in one position, and so that said second timer is deenergized through said third circuit means when said reversing switch means is in the opposite position.

References Cited by the Examiner
UNITED STATES PATENTS

| | | | |
|---|---|---|---|
| 1,592,390 | 7/1926 | Stanley | 318—284 X |
| 2,448,120 | 8/1948 | Petraske | 318—285 X |
| 2,696,580 | 12/1954 | Shewmon et al. | 318—281 |
| 3,011,079 | 11/1961 | Mellinger | 307—141.4 |
| 3,044,000 | 7/1962 | Bahra | 318—486 X |
| 3,181,048 | 4/1965 | Ficek et al. | 318—246 |
| 3,185,867 | 5/1965 | Bowman | 307—141.4 |

ORIS L. RADER, *Primary Examiner.*

J. C. BERENZWEIG, *Assistant Examiner.*